(12) United States Patent
Ivashin et al.

(10) Patent No.: US 8,099,662 B2
(45) Date of Patent: Jan. 17, 2012

(54) EFFICIENT IMAGE ANNOTATION DISPLAY AND TRANSMISSION

(75) Inventors: Victor Ivashin, Danville, CA (US); Jamie Rasmussen, Somerville, MA (US)

(73) Assignee: Seiko Epson Corporation, Tokyo (JP)

( * ) Notice: Subject to any disclaimer, the term of this patent is extended or adjusted under 35 U.S.C. 154(b) by 1036 days.

(21) Appl. No.: 12/016,008

(22) Filed: Jan. 17, 2008

(65) Prior Publication Data

US 2009/0187817 A1    Jul. 23, 2009

(51) Int. Cl.
  *G06F 17/00* (2006.01)
(52) U.S. Cl. ......................................................... 715/230
(58) Field of Classification Search .................. 715/229, 715/230, 231, 232, 233
  See application file for complete search history.

(56) References Cited

U.S. PATENT DOCUMENTS

| | | | |
|---|---|---|---|
| 6,006,241 A * | 12/1999 | Purnaveja et al. | 715/205 |
| 6,775,678 B1 * | 8/2004 | Hillberg et al. | 1/1 |
| 7,051,274 B1 * | 5/2006 | Cottrille et al. | 715/210 |
| 7,206,811 B2 | 4/2007 | Skurikhin et al. | |
| 7,219,127 B2 | 5/2007 | Huck et al. | |
| 7,224,847 B2 | 5/2007 | Zhang et al. | |
| 7,823,068 B2 * | 10/2010 | Cowtan et al. | 715/738 |
| 2003/0147099 A1 | 8/2003 | Heimendinger et al. | |
| 2005/0160356 A1 * | 7/2005 | Albornoz et al. | 715/512 |
| 2005/0223314 A1 * | 10/2005 | Varadarajan et al. | 715/512 |
| 2006/0015339 A1 * | 1/2006 | Charlesworth et al. | 704/251 |
| 2006/0020882 A1 * | 1/2006 | Beezer et al. | 715/512 |
| 2006/0101328 A1 | 5/2006 | Albornoz et al. | |
| 2007/0118794 A1 * | 5/2007 | Hollander et al. | 715/512 |
| 2007/0130529 A1 * | 6/2007 | Shrubsole | 715/762 |
| 2007/0250901 A1 * | 10/2007 | McIntire et al. | 725/146 |
| 2008/0154908 A1 * | 6/2008 | Datar et al. | 707/10 |
| 2008/0313214 A1 * | 12/2008 | Duhig et al. | 707/102 |

* cited by examiner

*Primary Examiner* — Laurie Ries

(57) ABSTRACT

Computer-readable media having corresponding apparatus embodies instructions executable by a computer to perform a method comprising: receiving, from a user interface, an annotation associated with a background image; adding the annotation to a queue of pending annotations; causing transmission of the annotation to a server; removing the annotation from the queue of pending annotations, and adding the annotation to a list of acknowledged annotations, when an acknowledgment of the annotation is received from the server; and generating a display image comprising the background image, annotations in the list of acknowledged annotations, and annotations in the queue of pending annotations.

21 Claims, 9 Drawing Sheets

Acknowledged Annotation List

| Annot. ID | Z-order | |
|---|---|---|
| 32 | 1 | ○ |
| 35 | 2 | ○ |
| 36 | 3 | ○ |

Pending Annotation List

| Annot. ID | Z-order | |
|---|---|---|
| None | None | ▯ |
| None | None | ▭ |

116

New Annotation

| Annot. ID | Z-order | |
|---|---|---|
| None | None | 〰 |

122

Composed Image (Back Buffer)

(Source Image or Virtual Whiteboard)

Acknowledged Annotation Buffer

Pending Annotations

New Annotation

Screen

EFFICIENT IMAGE ANNOTATION DISPLAY AND TRANSMISSION

BACKGROUND

The present invention relates generally to image processing, and more particularly to efficient image annotation display and transmission.

During a videoconference, participants often exchange ideas by annotating a background image such as a drawing or whiteboard using a drawing tool. One goal of such a system is to distribute the annotations so that the other participants can see the annotations as they are created. One way to reach this goal is to force the client to wait for an acknowledgment of each annotation from the server before allowing the annotator to add the next annotation. However, this technique frustrates the annotator, who must wait before crossing a "t" or dotting an "i."

SUMMARY

In general, in one aspect, an embodiment features a computer-readable media embodying instructions executable by a computer to perform a method comprising: receiving, from a user interface, an annotation associated with a background image; adding the annotation to a queue of pending annotations; causing transmission of the annotation to a server; removing the annotation from the queue of pending annotations, and adding the annotation to a list of acknowledged annotations, when an acknowledgment of the annotation is received from the server; and generating a display image comprising the background image, annotations in the list of acknowledged annotations, and annotations in the queue of pending annotations.

Embodiments of the computer-readable media can include one or more of the following features. In some embodiments, the acknowledgment of the annotation comprises the annotation. In some embodiments, generating the display image comprises: rendering the annotations in the list of acknowledged annotations with a first appearance; and rendering the annotations in the queue of pending annotations with a second appearance. In some embodiments, the acknowledgment of the annotation indicates a Z-order for the annotation; and the display image is generated according to the Z-orders of the annotations. In some embodiments, the method further comprises: removing one or more coordinates from the annotation before causing transmission of the annotation. In some embodiments, the method further comprises: checking a validity of the annotation before transmitting the annotation; and if the annotation is not valid, discarding the annotation without transmitting the annotation or adding the annotation to the queue of pending annotations. In some embodiments, the method further comprises: generating an acknowledged annotation image comprising the background image and the annotations in the list of acknowledged annotations; and generating the display image based on the acknowledged annotation image and the annotations in the queue of pending annotations.

In general, in one aspect, an embodiment features an apparatus comprising: an input module adapted to receive, from a user interface, an annotation associated with a background image; a control module adapted to add the annotation to a queue of pending annotations; an output module adapted to transmit the annotation from the apparatus to a server; wherein the control module removes the annotation from the queue of pending annotations, and adds the annotation to a list of acknowledged annotations, when an acknowledgment of the annotation is received by the apparatus from the server; and wherein the output module generates a display image comprising the background image, annotations in the list of acknowledged annotations, and annotations in the queue of pending annotations.

Embodiments of the apparatus can include one or more of the following features. In some embodiments, the acknowledgment of the annotation comprises the annotation. In some embodiments, to generate the display image, the output module renders the annotations in the list of acknowledged annotations with a first appearance, and renders the annotations in the queue of pending annotations with a second appearance. In some embodiments, the acknowledgment of the annotation indicates a Z-order for the annotation; and the output module generates the display image according to the Z-orders of the annotations. In some embodiments, the control module removes one or more coordinates from the annotation before transmitting the annotation. In some embodiments, the control module checks a validity of the annotation before transmitting the annotation, and if the annotation is not valid, discards the annotation without transmitting the annotation or adding the annotation to the queue of pending annotations. In some embodiments, the output module generates an acknowledged annotation image comprising the background image and the annotations in the list of acknowledged annotations; and wherein the output module generates the display image based on the acknowledged annotation image and the annotations in the queue of pending annotations.

In general, in one aspect, an embodiment features an apparatus comprising: input means for receiving, from a user interface, an annotation associated with a background image; control means for adding the annotation to a queue of pending annotations; output means for transmitting the annotation from the apparatus to a server; wherein the control means removes the annotation from the queue of pending annotations, and adds the annotation to a list of acknowledged annotations, when an acknowledgment of the annotation is received by the apparatus from the server; and wherein the output means generates a display image comprising the background image, annotations in the list of acknowledged annotations, and annotations in the queue of pending annotations.

Embodiments of the apparatus can include one or more of the following features. In some embodiments, the acknowledgment of the annotation comprises the annotation. In some embodiments, to generate the display image, the output means renders the annotations in the list of acknowledged annotations with a first appearance, and renders the annotations in the queue of pending annotations with a second appearance. In some embodiments, the acknowledgment of the annotation indicates a Z-order for the annotation; and the output means generates the display image according to the Z-orders of the annotations. In some embodiments, the control means removes one or more coordinates from the annotation before transmitting the annotation. In some embodiments, the control means checks a validity of the annotation before transmitting the annotation, and if the annotation is not valid, discards the annotation without transmitting the annotation or adding the annotation to the queue of pending annotations. In some embodiments, the output means generates an acknowledged annotation image comprising the background image and the annotations in the list of acknowledged annotations; and wherein the output means generates the display image based on the acknowledged annotation image and the annotations in the queue of pending annotations.

The details of one or more implementations are set forth in the accompanying drawings and the description below. Other features will be apparent from the description and drawings, and from the claims.

Figure 1:
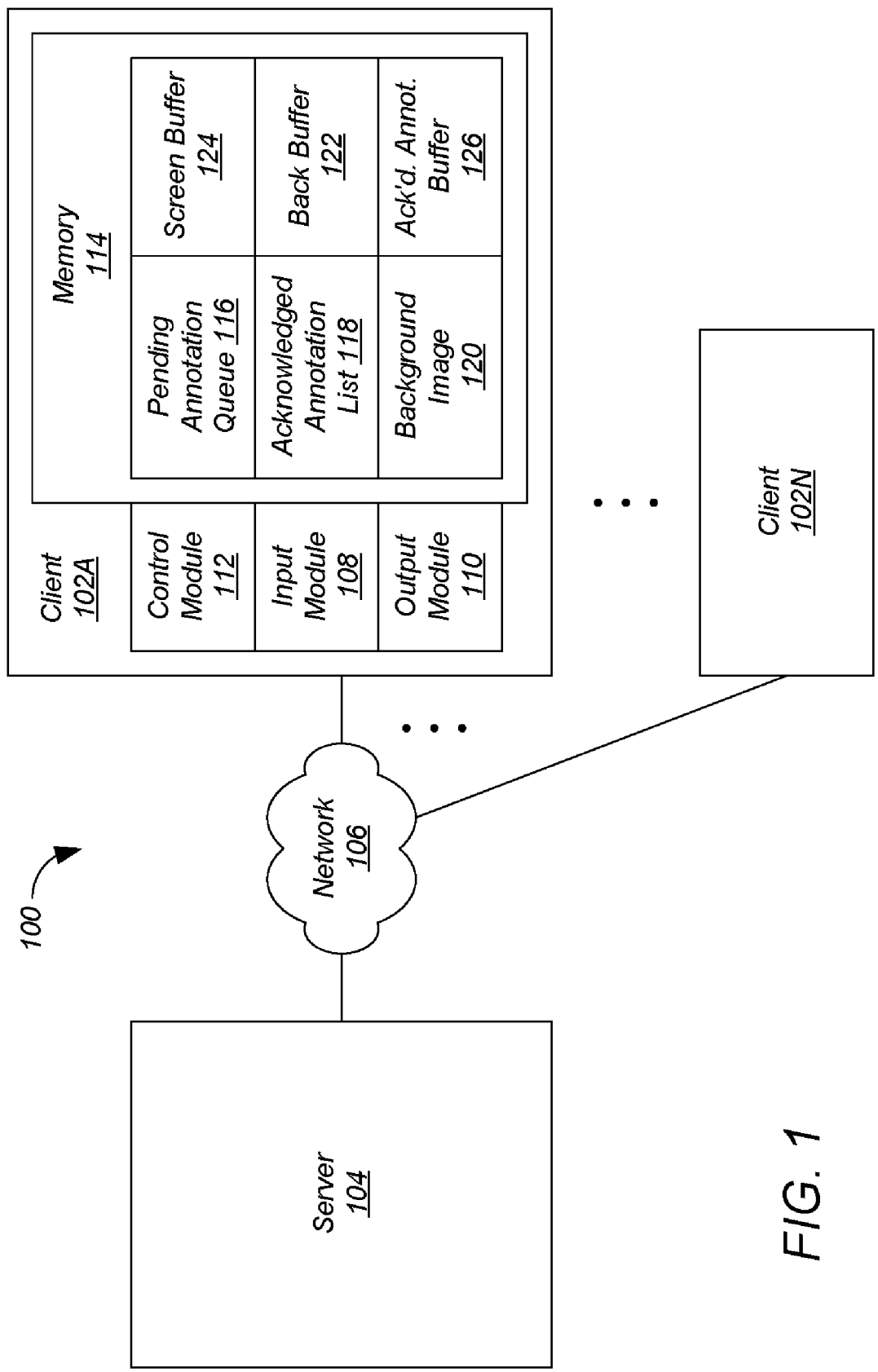
FIG. 1 shows an annotation system according to one embodiment.

The leading digit(s) of each reference numeral used in this specification indicates the number of the drawing in which the reference numeral first appears.

DETAILED DESCRIPTION

Various embodiments provide efficient image annotation display and transmission. Embodiments of the present invention can be used in videoconferencing systems, but they are not so limited, and can apply to any system where the annotator would otherwise have to wait for an acknowledgement of an annotation before creating the next annotation. For example, the system could include a single annotation client communicating with a database.

According to various embodiments, when a client receives an annotation of a background image generated by a user of the client, the client adds the annotation to a queue of pending annotations, and transmits the annotation to the server. The annotator can immediately proceed with the next annotation. When an acknowledgment of the annotation is received from the server, the client moves the annotation from the queue of pending annotations to a list of acknowledged annotations. The client generates a display image for the annotator that includes the background image, the annotations in the list of acknowledged annotations, and the annotations in the queue of pending annotations. Therefore the annotator need not wait for acknowledgment of one annotation before drawing the next, and can see all of his annotations in the display image, including annotations that have not been acknowledged by the server.

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

FIG. 1 shows an annotation system 100 according to one embodiment. Although in the described embodiments, the elements of annotation system 100 are presented in one arrangement, other embodiments may feature other arrangements, as will be apparent to one skilled in the relevant arts based on the disclosure and teachings provided herein. For example, the elements of annotation system 100 can be implemented in hardware, software, or combinations thereof.

Referring to FIG. 1, annotation system 100 includes one or more videoconference clients 102A-N in communication with a videoconference server 104 over a network 106. Network 106 can be implemented as a wide-area network such as the Internet, a local-area network (LAN), or the like, but while embodiments of the present invention are described with respect to network communications, they are equally applicable to devices employing other forms of data communications such as direct links and the like. Client 102A includes an input module 108, an output module 110, a control module 112, and a memory 114. Memory 114 stores a pending annotation queue 116, an acknowledged annotation list 118, a background image 120, a back buffer 122, and a screen buffer 124. In some embodiments, memory 114 also stores an acknowledged annotation image in an acknowledged annotation buffer 126, as described below. While pending annotation queue 116 and acknowledged annotation list 118 are described as a queue and list, respectively, they can take the form of other data structures. Other clients 102 in annotation system 100 can include similar elements.

Figure 2:
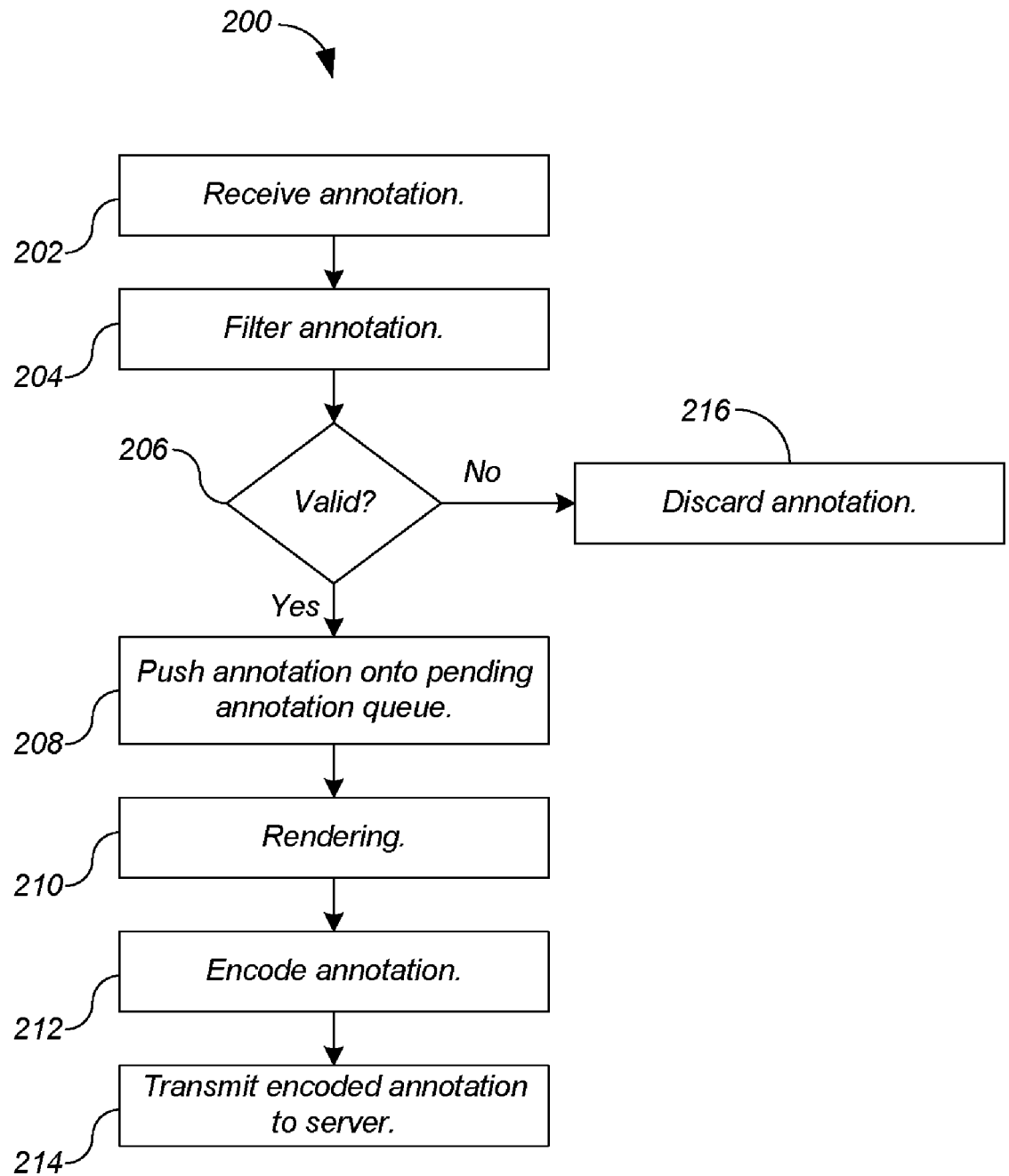
FIG. 2 shows an annotation transmission process for a client of FIG. 1 according to one embodiment.

FIG. 2 shows an annotation transmission process 200 for a client 102 of FIG. 1 according to one embodiment. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Figure 3:
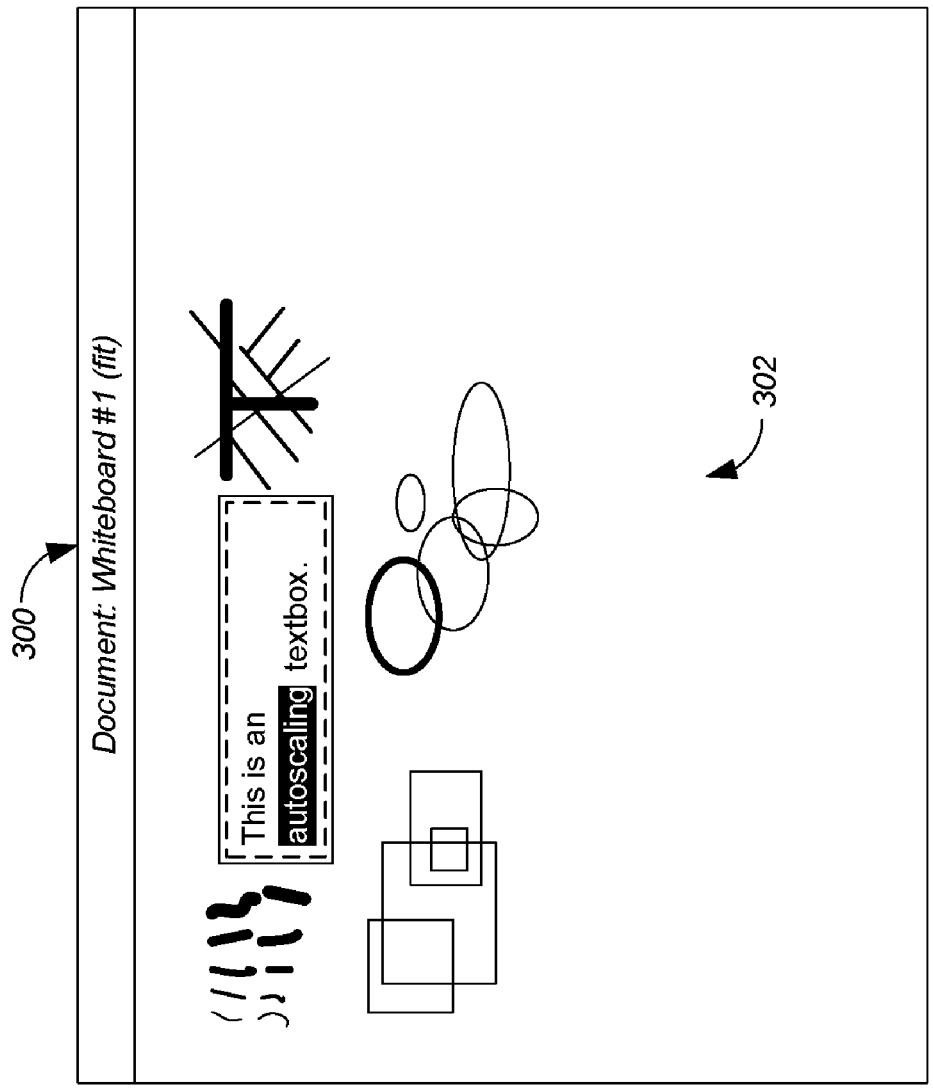
FIG. 3 shows an example virtual whiteboard according to one embodiment.

Referring to FIG. 2, input module 108 of client 102 receives an annotation associated with a background image (step 202). The background image can contain other items, as in the case when a user annotates a document, drawing or the like, or can be an empty image, as in the case when a user annotates a virtual whiteboard or the like. FIG. 3 shows an example virtual whiteboard 300 according to one embodiment. Referring to FIG. 3, virtual whiteboard 300 includes several annotations 302, contributed by multiple users, including rectangles, ellipses, and an autoscaling text box.

To annotate an image, users employ annotation tools to create annotations. Users can use toolbar buttons to select the annotation tools. Annotation tools can include pen, highlighter, textbox, line, rectangle, ellipse, eraser tools, and the like. Multiple users can annotate the same image simultaneously. Server 104 maintains the order of the annotations submitted by each user. Server 104 also determines the proper order of all of the annotations received from multiple users, for example based on time of arrival and the like.

The pen and highlighter tools create the same type of annotation, but with differing opacity values for the color used. The eraser tool does not generate an annotation, but instead triggers action commands that delete one or all annotations for an image. Most of these tools are familiar to users of conventional drawing programs. Of course, many other annotation tools and user interface representations are possible.

The textbox tool allows the user to create textboxes to display any length of typed text, with all text shown with the same font and font size. The font size is automatically calculated so that all of the text in the annotation fits in the box that defines the annotation's bounds. The user can make the font size larger or smaller by dragging the corner of the box, and can reposition the box anywhere on the page. The text in the box wraps at word boundaries automatically. Any user can edit the text after the textbox annotation has been received from server 104.

The annotation tools provide flexible styles, which give the user the ability for rich creative expression. The available styles depend on the annotation tool selected. For example, when drawing a rectangle, the user may choose the rectangle's border thickness, color, and whether it is opaque, translucent, or hollow. These choices are made available through graphical dropdown controls in the annotation toolbar. The dropdown controls are also available via a context menu, with the dropdown controls shown being dependent on the currently selected tool and the state of keyboard modifiers. Of course many other annotation styles and user interface representations are possible.

In order to increase creative control, some annotation tools change behavior based on keyboard modifiers such as the pressed state of the Control and Shift keys. For example, the rectangle tool draws perfect squares when the Shift key is pressed. The action of a tool can also depend on mouse button state. For example, when the eraser tool is selected, dragging the cursor with the right mouse button down erases any annotation the cursor touches, and double-clicking the left mouse button erases all annotations. Of course other modifier actions and mappings are possible.

Some embodiments provide support for graphics tablets. Clients 102 automatically detect the presence of graphics tablets, and can use two additional types of information from this specialized input device: pressure and stylus orientation. Pressure is used to select line thickness at a finer resolution than is available through the toolbar dropdown controls. For the pen and highlighter tools, the maximum pressure observed during a stroke determines a constant thickness for that stroke. Alternatively, stylus pressure information can be used to determine the thickness of line segments between points within a single stroke, thereby allowing improved creation of logograms.

Changes in the stylus orientation are processed by changing the selected annotation tool. For example, if the user switches to the eraser end of the stylus, the eraser tool is automatically selected. When the user switches back to the other end of the stylus, the last used non-eraser tool is automatically selected. Client 102 can also detect when the user switches between the stylus and the special mouse that is part of the graphics tablet system, and can select or deselect annotation tools as applicable. Of course, client 102 can make use of other tablet features or other specialized input devices.

Figure 4:
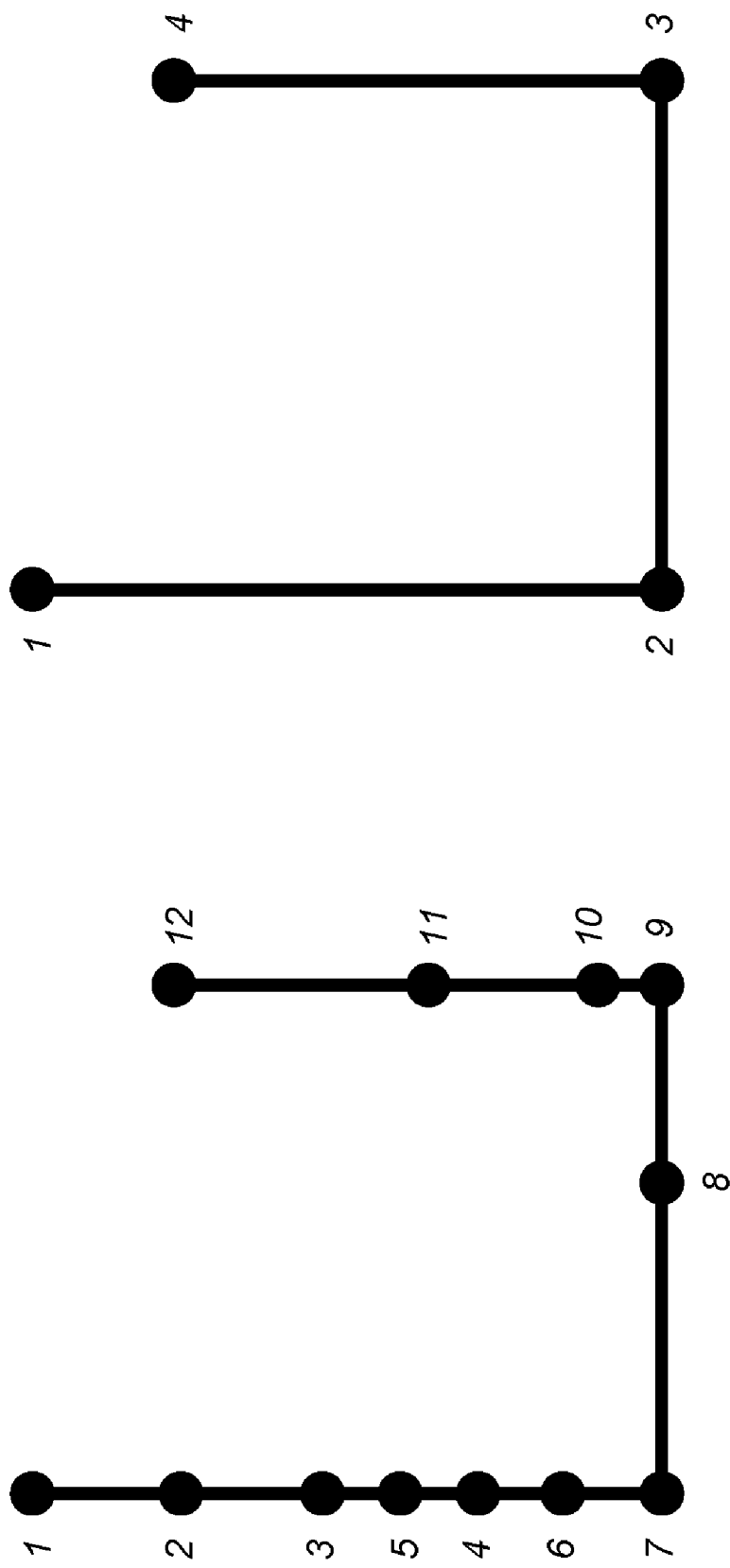
FIG. 4 illustrates a pen stroke annotation before and after filtering, where 12 points were received during the creation of the annotation, but only four points are kept.

Referring again to FIG. 2, the annotation is filtered after reception by client 102 to remove unnecessary data (step 204). The filtering done depends on the type of annotation. For example, when the same line thickness is used for all segments of a pen annotation, interim coordinates that will not change the rendering of a stroke can be removed. FIG. 4 illustrates a pen stroke annotation before and after filtering, where 12 points were received during the creation of the annotation, but only four points are kept. The unfiltered stroke shows that even back-tracking along the path of a stroke (seen in the relative position of points three through six) can sometimes be filtered out. But if the per-segment line thickness varies based on pressure, then the thickness of the line is taken into account when determining which coordinates may be filtered out.

Referring again to FIG. 2, after filtering, client 102 determines whether the annotation is valid and should be kept (step 206). This determination depends on the type of the annotation, but in general is decided by whether the annotation would have a visible rendering. For example, if a user deletes all text in an existing textbox, client 102 treats that input as a request to erase that textbox annotation, rather than transmitting a textbox annotation with an empty string. Similarly, if the user creates a rectangle with zero width or height, then the rectangle is discarded rather than transmitted. If the annotation is determined to be invalid, the annotation is discarded (step 216).

Figure 5:
FIG. 5 shows example renderings of a textbox annotation in the normal, active, edit, and delete states, from left to right.
Figure 5:
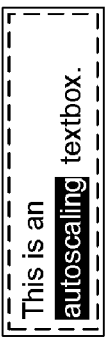
Figure 5:

When a valid annotation has been completed, control module 112 pushes the annotation onto pending annotation queue 116 (step 208) and triggers rendering (step 210). Annotation system 100 supports several annotation states, which determine how an annotation is rendered. For example, annotations in different states can be rendered with different appearances to allow the user to determine the state of each annotation visually. The annotation states include unconfirmed, normal, active, edit, and delete. Some annotation types may render in the same way for more than one state. FIG. 5 shows example renderings of a textbox annotation in the normal, active, edit, and delete states, from left to right.

New annotations, and annotations not yet acknowledged by server 104, are rendered in the unconfirmed state. For most annotation types, the rendering of unconfirmed annotations is the same as the rendering of normal annotations except for the use of a slightly darker color. This rendering allows the new annotation to be visible against a background of like-colored acknowledged annotations while it is pending acknowledgement by server 104. Acknowledged annotations are rendered in the normal state, blending seamlessly with other like-colored normal annotations.

Figure 6:
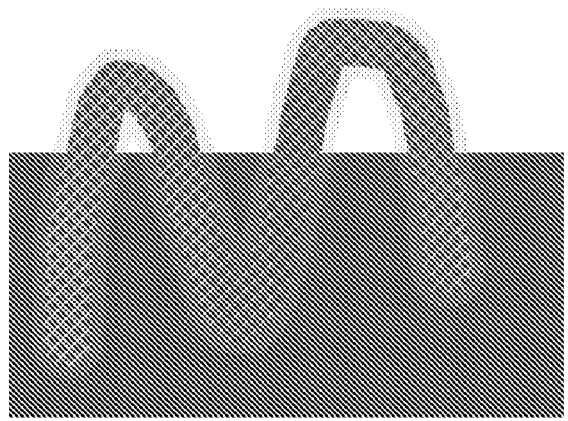
FIG. 6 shows examples, from left to right, of the unconfirmed, normal, and delete states of a pen annotation against a background image including a rectangle annotation rendered in the normal state.
Figure 6:
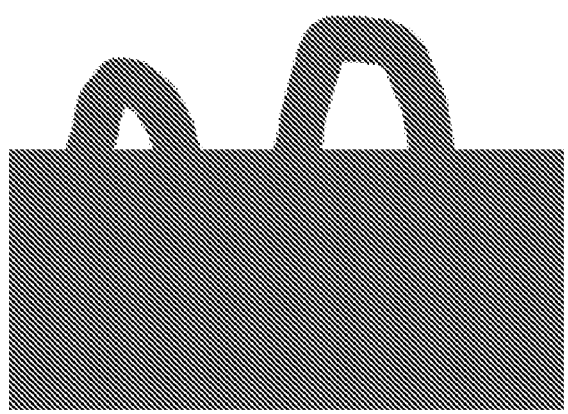
Figure 6:
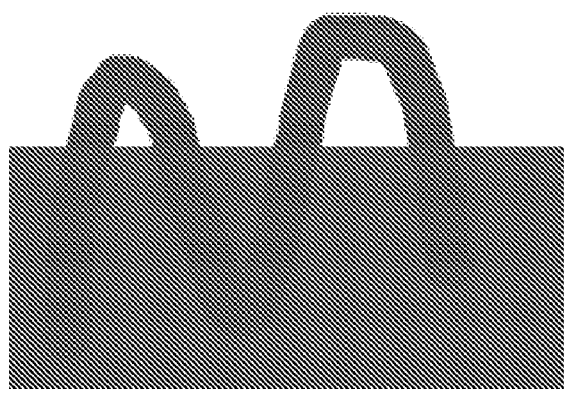

When the eraser tool is selected, the annotation indicated by the cursor is rendered in the delete state. An annotation in the delete state is surrounded by a translucent glow effect in a complementary color, and for most annotation types, an opaque hatch pattern is rendered over the annotation in the same complementary color. FIG. 6 shows examples, from left to right, of the unconfirmed, normal, and delete states of a pen annotation against a background image including a rectangle annotation rendered in the normal state. Of course, other rendering options are possible for each state.

Annotations are stored in a vector format, as opposed to a raster format, allowing the annotations to be transmitted efficiently, and to be scaled to any zoom level without artifacts. Some variables are common to all or most annotation types, such as type, a server-assigned ID number, a server-assigned Z-order, the ID number of the creating or editing user, the media ID and page number of the image the annotation is associated with, a list of coordinates for positioning the annotation, and the like.

Each annotation type extends the generic annotation behavior with behavior that is specific to that annotation type. This overall structure allows new annotation types to be defined easily. An example of type-specific behavior is the way an annotation interprets its size and position variables when it is asked to render. Another example of type-specific behavior is that while all annotations have the ability to perform a hit test (that is, to report whether the annotation covers a specified point), the actual method for performing the hit test is specific to the type of the annotation. The hit test calculation is performed intelligently. For example, first the point is checked against the rectangular bounding box of the annotation, which can yield a false answer quickly. The hit test also takes into account the fact that very thin line annotations are difficult to mouse over exactly, and therefore returns a true answer if the specified point is "close enough" to the line.

The position of the annotation is specified by coordinates that are relative to the upper-left corner of the associated background image, in pixel units. This technique ensures that the annotation can be rendered correctly by any participant, regardless of the screen resolution, onscreen position, zoom level, and the like. Client 102 has facilities for translating points between many different coordinate systems, including pixels relative to the window, the screen, and the like.

The user can turn off the rendering of annotations. This allows the user to see the portions of the background image that would otherwise be obscured by the annotations. Some user actions, such as changing the selected annotation tool, ensures annotation rendering is turned on.

Figure 7:
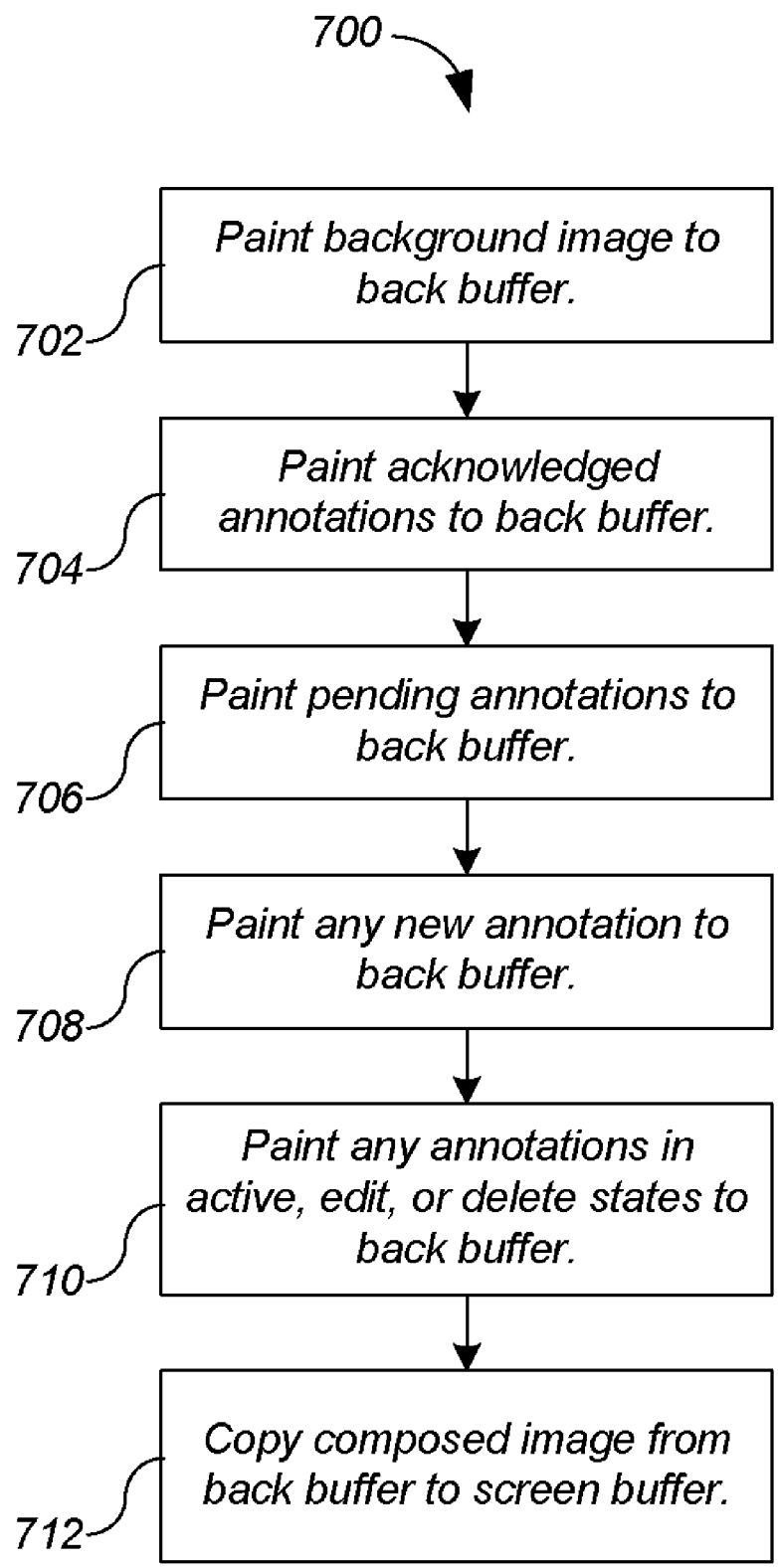
FIG. 7 shows a rendering process for a client of FIG. 1 according to one embodiment.

FIG. 7 shows a rendering process 700 for a client 102 of FIG. 1 according to one embodiment. Although in the described embodiments, the elements of process 700 are presented in one arrangement, other embodiments may feature other arrangements, as will be apparent to one skilled in the relevant arts based on the disclosure and teachings provided herein.

Referring to FIG. 7, background image 120 is painted to back buffer 122 (step 702). Next, the acknowledged annotations (that is, the annotations stored in acknowledged annotation list 118) are painted to back buffer 122, in the Z-order assigned by server 104, in the normal state (step 704). Next, the pending annotations (that is, the annotations stored in pending annotation queue 116) are painted to back buffer 122, in the order in which they entered pending annotation queue 116, in the unconfirmed state (step 706). Next, any new annotation is painted to back buffer 122 in the unconfirmed state (step 708). Next, any annotations in the active, edit, or delete states are painted to back buffer 122 in their respective states (step 710).

The painting order of process 700 ensures that the full extent of any annotation with which the user is interacting is visible (subject to viewpoint cropping of course), even if the annotation is partially obscured by another annotation. Because pending annotations have not yet had a Z-order assigned by server 104, they are painted after the acknowledged annotations. A new annotation or annotation in the active/edit/delete state is painted next to ensure that it is not obscured. The combination of the background image with the annotations in their proper order is referred to as the "composed image." Referring again to FIG. 7, the composed image in back buffer 122 is copied to screen buffer 124 as a display image, thereby causing the display image to be displayed (step 712).

Figure 8:
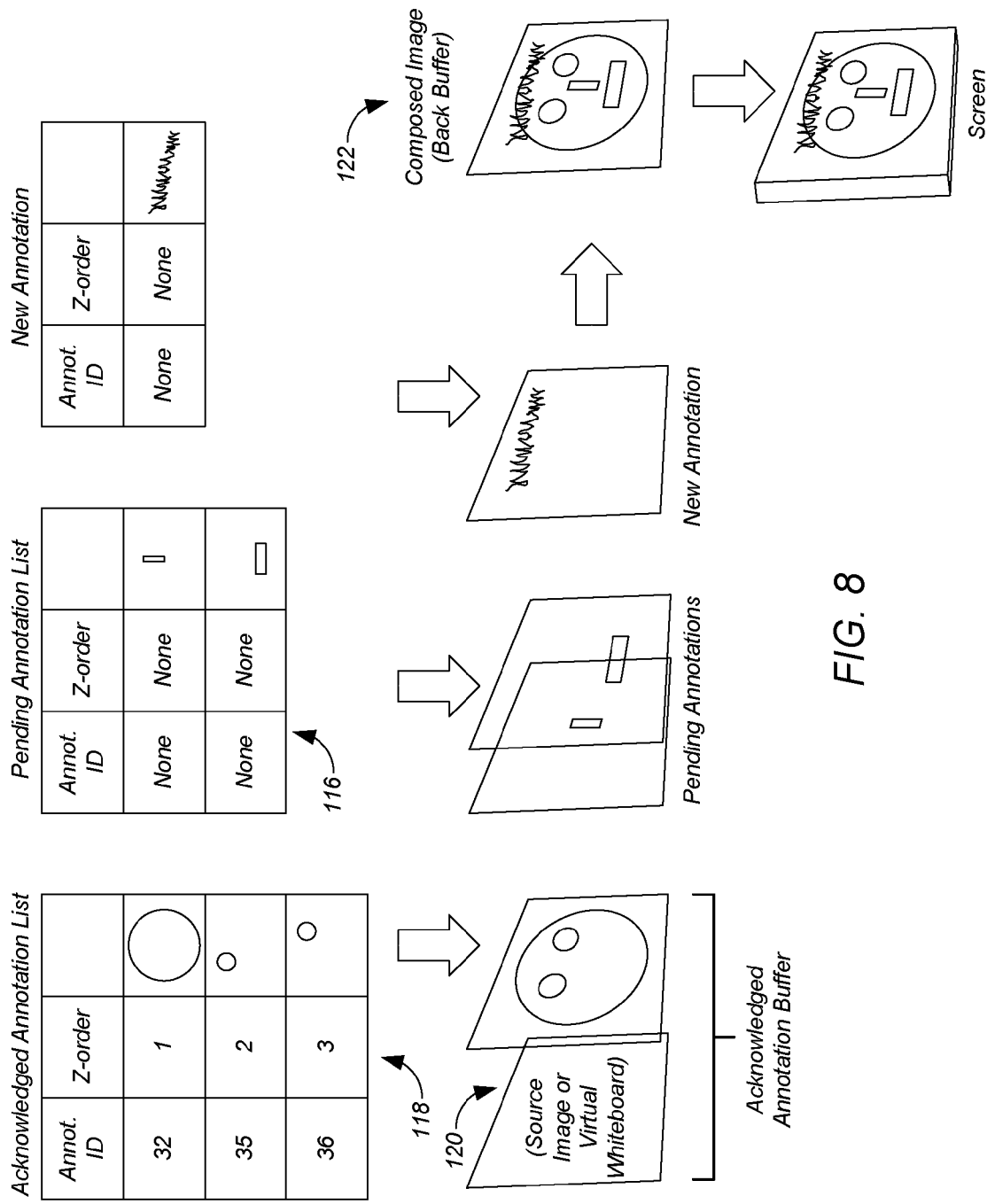
FIG. 8 illustrates an example of the process of FIG. 7.

FIG. 8 illustrates an example of process 700. Referring to FIG. 8, acknowledged annotation list 118 includes three circular annotations having annotation IDs and Z-orders assigned by server 104. Pending annotation queue 116 includes two rectangular annotations, and a new freehand annotation is being drawn. In some embodiments, preliminary annotation IDs and Z-orders can be assigned by client 102. However, server 104 can modify the preliminary annotation IDs and Z-orders, for example based on determining the proper order of annotations submitted by multiple users.

The composed image is changed and must be updated every time a change is made to a new annotation, for example when the user is creating a pen annotation and drags the mouse in a manner that extends the new annotation's coordinates. One approach to updating the composed image would be to repaint each acknowledged annotation on top of the background image, then the pending annotations, and so on, as in process 700 of FIG. 7. However, repainting all of the acknowledged annotations can be computationally expensive, particularly when an annotation is complicated, or when there are many annotations in the list. If the repainting is slow, it can cause a variety of problems. In addition to delaying the visual feedback to the user, the unnecessary burden on the computing device can cause the operating system to report fewer mouse position updates to the application. This can turn a smooth movement by the user, such as drawing a curve with the pen tool, into a very rough polyline.

To avoid these problems, some embodiments maintain an acknowledged annotation image comprising a copy of the background image, together with all of the acknowledged annotations painted on top in the normal state, in an acknowledged annotation buffer 126. Then when rendering is triggered, the viewed portion of the acknowledged annotation image is copied into back buffer 122, replacing steps 702-704 of FIG. 7. Steps 706-712 then follow as described above. The painting of the composed image proceeds more quickly because the number of annotations in pending annotation queue 116 tends to be small, and there is at most one new annotation at any time.

Referring again to FIG. 2, the annotation is encoded (step 212) and output module 110 transmits the encoded annotation to server 104 (step 214). For example, the annotation is encoded in a suitable binary format, and is transmitted in the form of a command. User input with the eraser tool is also converted to a command. In addition, client 102 can send a command to request that server 104 transmit all of the annotations for a document. This allows client 102 to request annotations at an opportune time, such as after all data necessary to render the document has downloaded, or when a document is first viewed.

Figure 9:
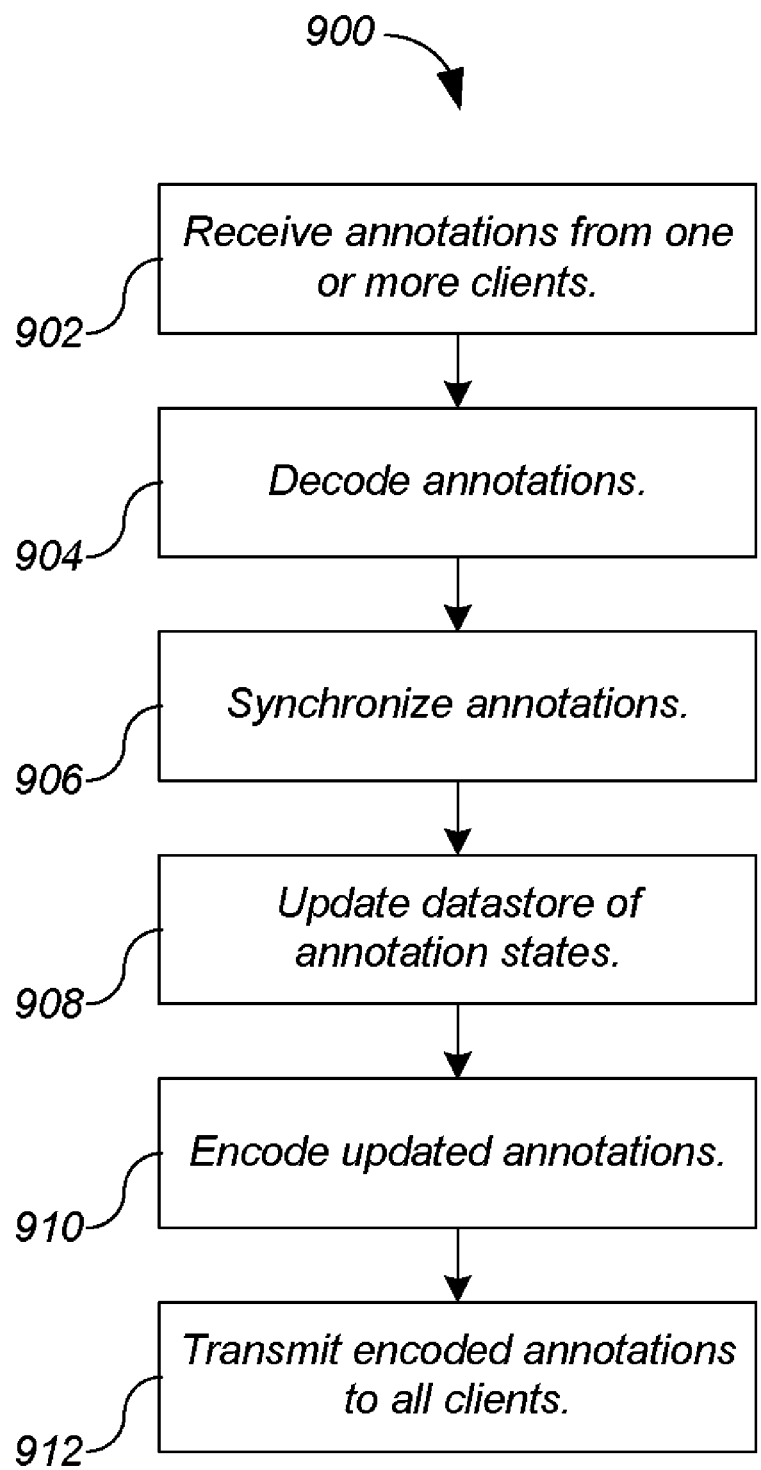
FIG. 9 shows a process for the server of FIG. 1 according to one embodiment.

FIG. 9 shows a process 900 for server 104 of FIG. 1 according to one embodiment. Although in the described embodiments, the elements of process 900 are presented in one arrangement, other embodiments may feature other arrangements, as will be apparent to one skilled in the relevant arts based on the disclosure and teachings provided herein. For example, in various embodiments, some or all of the steps of process 900 can be executed in a different order, concurrently, and the like.

Referring to FIG. 9, server 104 receives annotations from one or more clients 102 (step 902), for example by receiving commands representing the annotations. Server 104 decodes each annotation (step 904), for example by extracting the annotation information from a command representing the annotation. Server 104 ensures received annotations are synchronized (step 906) and updates a datastore of the annotation states (step 908).

Because annotations for a single background image 120 can occur simultaneously at different clients 102, server 104 is responsible for determining the proper order of the annotations. The datastore is used to maintain the current set of annotations in the conference, allowing a latecomer to the conference to receive the correct annotation set when joining the conference. Server 104 is responsible for ensuring that all of the annotations necessary to synchronize the annotation set with the new client 102 have been transmitted before sending any annotation commands that may have been received from other clients 102 during the initialization of the new client 102.

Server 104 also assigns certain identifiers to each annotation based on the synchronization. For example, server 104 assigns an annotation ID number and Z-order to each annotation if necessary. Each updated annotation is then encoded (step 910) and transmitted to all of the clients 102 (step 912), including the client 102 that generated the annotation. In other embodiments, instead of transmitting the annotation to the client that generated the annotation, server 104 transmits an acknowledgment of the annotation.

Figure 10:
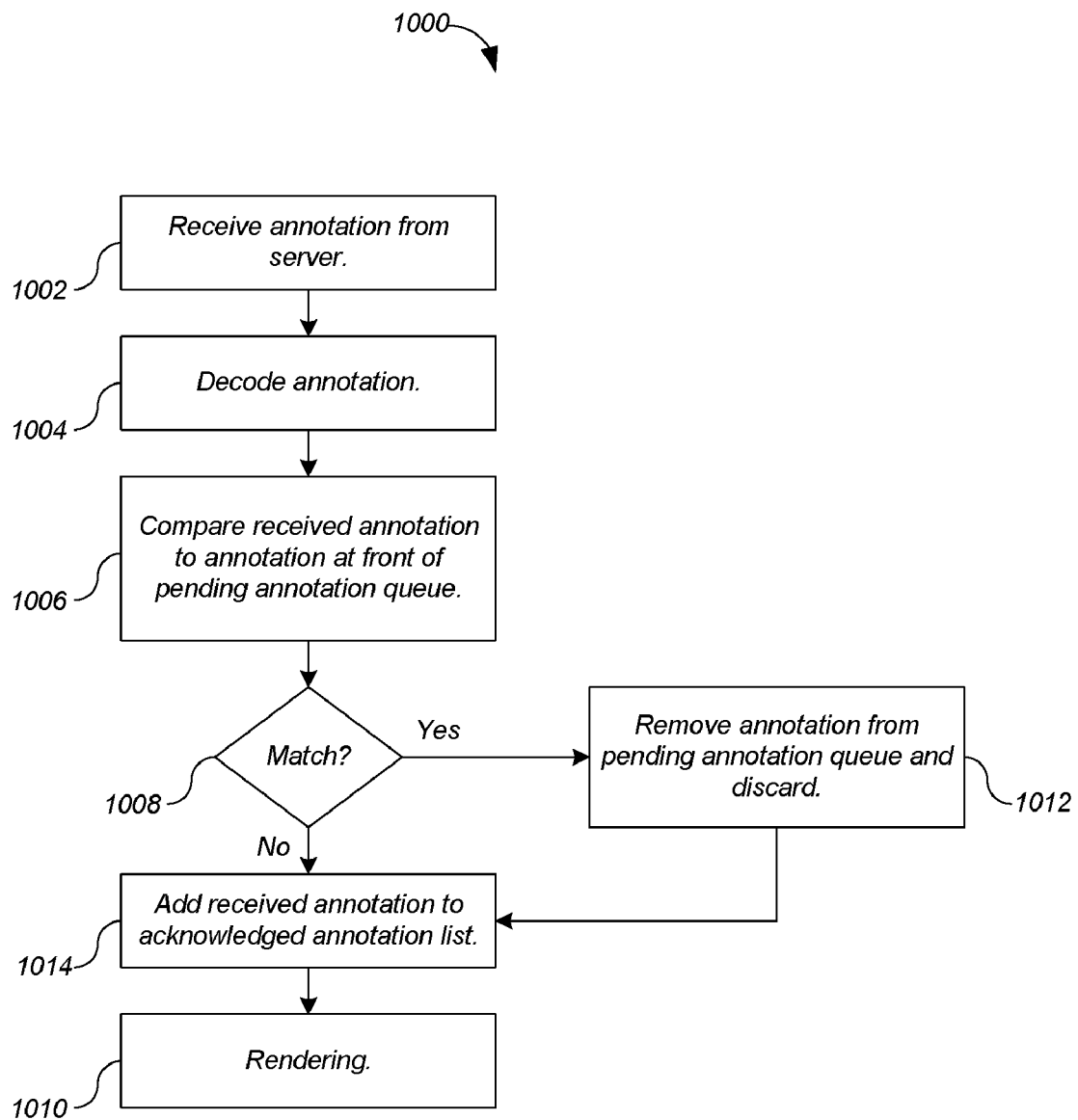
FIG. 10 shows an annotation reception process for a client of FIG. 1 according to one embodiment.

FIG. 10 shows an annotation reception process 1000 for a client 102 of FIG. 1 according to one embodiment. Although in the described embodiments, the elements of process 1000 are presented in one arrangement, other embodiments may feature other arrangements, as will be apparent to one skilled in the relevant arts based on the disclosure and teachings provided herein. For example, in various embodiments, some or all of the steps of process 1000 can be executed in a different order, concurrently, and the like.

Referring to FIG. 10, input module 108 of client 102 receives an annotation from server 104 (step 1002), for example by receiving a command representing the annotation. Client 102 decodes the annotation (step 1004), for example by extracting the annotation information from the command representing the annotation. Client 102 then compares the received annotation to the annotation at the front of pending annotation queue 116 (step 1006). The comparison can be made based on the characteristics of the annotation and the like. Only the front of pending annotation queue 116 needs to be checked because server 104 acknowledges annotations in the order received.

If the compared annotations do not match (step 1008), then the received annotation was generated by another client 102 in the conference, and therefore after adding the received annotation to the list of acknowledged annotations (step 1014), rendering is triggered (step 1010), for example as described above with reference to FIG. 7. But if the compared annotations match (step 1008), the received annotation constitutes an acknowledgement of the annotation at the front of pending annotation queue 116, which is removed from pending annotation queue 116 and discarded (step 1012). The received annotation is added to acknowledged annotation list 118 (step 1014).

To add the annotation to acknowledged annotation list 118, client 102 first determines whether acknowledged annotation list 118 already contains an annotation having the same annotation ID as the received annotation. If so, the annotation in acknowledged annotation list 118 is replaced with the received annotation. Otherwise, the received annotation is a new annotation, so client 102 adds the received annotation to acknowledged annotation list 118. Finally, rendering is triggered (step 1008).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. Computer-readable media embodying instructions executable by a computer to perform a method comprising:
    receiving, from a user interface, an annotation associated with a background image;
    adding the annotation to a queue of pending annotations;
    causing transmission of the annotation to a server;
    removing the annotation from the queue of pending annotations, and adding the annotation to a list of acknowledged annotations, when an acknowledgment of the annotation is received from the server; and
    generating a display image comprising
        the background image,
        annotations in the list of acknowledged annotations, and
        annotations in the queue of pending annotations.

2. The computer-readable media of claim 1:
    wherein the acknowledgment of the annotation comprises the annotation.

3. The computer-readable media of claim 1, wherein generating the display image comprises:
    rendering the annotations in the list of acknowledged annotations with a first appearance; and
    rendering the annotations in the queue of pending annotations with a second appearance.

4. The computer-readable media of claim 1:
    wherein the acknowledgment of the annotation
    indicates a Z-order for the annotation; and
    wherein the display image is generated according to the Z-orders of the annotations.

5. The computer-readable media of claim 1, wherein the method further comprises:
    removing one or more coordinates from the annotation before causing transmission of the annotation.

6. The computer-readable media of claim 1, wherein the method further comprises:
    checking a validity of the annotation before transmitting the annotation; and
    if the annotation is not valid, discarding the annotation without transmitting the annotation or adding the annotation to the queue of pending annotations.

7. The computer-readable media of claim 1, wherein the method further comprises:
    generating an acknowledged annotation image comprising the background image, and the annotations in the list of acknowledged annotations; and generating the display image based on the acknowledged annotation image and the annotations in the queue of pending annotations.

8. An apparatus comprising:
one or more processors and a memory;
an input module adapted to receive, from a user interface, an annotation associated with a background image;
a control module adapted to add the annotation to a queue of pending annotations;
an output module adapted to transmit the annotation from the apparatus to a server;
wherein the control module removes the annotation from the queue of pending annotations, and adds the annotation to a list of acknowledged annotations, when an acknowledgment of the annotation is received by the apparatus from the server;
wherein the output module generates a display image comprising
the background image,
annotations in the list of acknowledged annotations, and
annotations in the queue of pending annotations; and
wherein the one or more processors and the memory cooperate to implement at least in part the input, output and control modules.

9. The apparatus of claim 8:
wherein the acknowledgment of the annotation comprises the annotation.

10. The apparatus of claim 8:
wherein, to generate the display image, the output module renders the annotations in the list of acknowledged annotations with a first appearance, and renders the annotations in the queue of pending annotations with a second appearance.

11. The apparatus of claim 8:
wherein the acknowledgment of the annotation indicates a Z-order for the annotation; and
wherein the output module generates the display image according to the Z-orders of the annotations.

12. The apparatus of claim 8:
wherein the control module removes one or more coordinates from the annotation before transmitting the annotation.

13. The apparatus of claim 8:
wherein the control module checks a validity of the annotation before transmitting the annotation, and if the annotation is not valid, discards the annotation without transmitting the annotation or adding the annotation to the queue of pending annotations.

14. The apparatus of claim 8:
wherein the output module generates an acknowledged annotation image comprising
the background image, and
the annotations in the list of acknowledged annotations; and
wherein the output module generates the display image based on the acknowledged annotation image and the annotations in the queue of pending annotations.

15. An apparatus comprising:
one or more processors and a memory;
input means for receiving, from a user interface, an annotation associated with a background image;
control means for adding the annotation to a queue of pending annotations;
output means for transmitting the annotation from the apparatus to a server;
wherein the control means removes the annotation from the queue of pending annotations, and adds the annotation to a list of acknowledged annotations, when an acknowledgment of the annotation is received by the apparatus from the server;
wherein the output means generates a display image comprising
the background image,
annotations in the list of acknowledged annotations, and
annotations in the queue of pending annotations; and
wherein the one or more processors and the memory cooperate to implement at least in part the input, output and control means.

16. The apparatus of claim 15:
wherein the acknowledgment of the annotation comprises the annotation.

17. The apparatus of claim 15:
wherein, to generate the display image, the output means renders the annotations in the list of acknowledged annotations with a first appearance, and renders the annotations in the queue of pending annotations with a second appearance.

18. The apparatus of claim 15:
wherein the acknowledgment of the annotation indicates a Z-order for the annotation; and
wherein the output means generates the display image according to the Z-orders of the annotations.

19. The apparatus of claim 15:
wherein the control means removes one or more coordinates from the annotation before transmitting the annotation.

20. The apparatus of claim 15:
wherein the control means checks a validity of the annotation before transmitting the annotation, and if the annotation is not valid, discards the annotation without transmitting the annotation or adding the annotation to the queue of pending annotations.

21. The apparatus of claim 15:
wherein the output means generates an acknowledged annotation image comprising
the background image, and
the annotations in the list of acknowledged annotations; and
wherein the output means generates the display image based on the acknowledged annotation image and the annotations in the queue of pending annotations.

* * * * *